(12) United States Patent
Hu et al.

(10) Patent No.: US 8,711,681 B2
(45) Date of Patent: Apr. 29, 2014

(54) SWITCH REDUNDANCY IN SYSTEMS WITH DUAL-STAR BACKPLANES

(75) Inventors: Michael W. Hu, Portland, OR (US); Andrew P. Alleman, Portland, OR (US)

(73) Assignee: Radisys Corporation, Hillsboro, OR (US)

( * ) Notice: Subject to any disclaimer, the term of this patent is extended or adjusted under 35 U.S.C. 154(b) by 126 days.

(21) Appl. No.: 13/369,073

(22) Filed: Feb. 8, 2012

(65) Prior Publication Data

US 2013/0201819 A1  Aug. 8, 2013

(51) Int. Cl.
*H04L 1/00*  (2006.01)

(52) U.S. Cl.
USPC ............................. 370/219; 370/225; 370/242

(58) Field of Classification Search
USPC .................... 370/216–221, 225, 242, 244
See application file for complete search history.

(56) References Cited

U.S. PATENT DOCUMENTS

| | | | | |
|---|---|---|---|---|
| 6,108,300 | A * | 8/2000 | Coile et al. | 370/217 |
| 7,006,431 | B1 * | 2/2006 | Kanekar et al. | 370/217 |
| 7,483,370 | B1 * | 1/2009 | Dayal et al. | 370/219 |
| 2002/0169794 | A1 * | 11/2002 | Jones et al. | 707/204 |
| 2004/0085894 | A1 * | 5/2004 | Wang et al. | 370/216 |
| 2006/0262781 | A1 * | 11/2006 | Campini et al. | 370/389 |
| 2007/0104091 | A1 * | 5/2007 | Lee et al. | 370/216 |
| 2008/0291907 | A1 * | 11/2008 | Rogasch | 370/359 |
| 2009/0073875 | A1 * | 3/2009 | Kashyap | 370/228 |
| 2011/0228669 | A1 * | 9/2011 | Lei et al. | 370/219 |

OTHER PUBLICATIONS

ZNYX Networks, "Network Level Resiliency for High Availability (HA) in Ethernet Networks," Jun. 18, 2002, <<http://docs.znyx.com/products/software/openarchitect/OAHA/OA_HA_30page_001_web.pdf>>, last accessed Dec. 6, 2011.

\* cited by examiner

*Primary Examiner* — Gary Mui
*Assistant Examiner* — Kabir Jahangir
(74) *Attorney, Agent, or Firm* — Stoel Rives LLP

(57) ABSTRACT

Backplane redundancy is provided for a system including multiple nodes that communicate packets through first and second switches. Assuming that the first switch is initially assigned to an active state and the second switch to a standby state, the nodes communicate the data packets through physically enabled first backplane links to the first switch. The nodes physically enable second backplane links that are in a condition to communicate the data packets to the second switch. A messageless failover process is initiated by temporarily disabling, at the first switch, the first backplane links between the first switch and the nodes. In response to the nodes detecting the disabled first backplane links to the first switch, the nodes reconfigure themselves to communicate the data packets through the second backplane links to the second switch and to stop communicating the packets through the first backplane links to the first switch.

31 Claims, 5 Drawing Sheets

SWITCH REDUNDANCY IN SYSTEMS WITH DUAL-STAR BACKPLANES

TECHNICAL FIELD

This disclosure relates to distributed computing systems that incorporate switching for backplane communications. In particular, this disclosure relates to methods, systems, and computer readable media for initiating and coordinating active/standby failovers in a switching system with a dual-star backplane topology via link state changes.

BACKGROUND OF THE DISCLOSURE

Certain computing architectures use redundant switching to ensure reliable communication between a network and a plurality of processing nodes. Some systems may use a dual-star backplane for interconnecting processing nodes within the system. In Advanced Telecommunications Computing Architecture (ATCA), for example, there are two dual-star backplanes, which are called the Base and Fabric Ethernet interfaces. Such a topology provides a redundant Ethernet network for data path traffic, which passes between the switches and a plurality of node modules on the backplane. If one Ethernet network fails on the Base or the Fabric interface, the traffic is switched over to the other Ethernet network on the Base interface or the Fabric interface. However, there is no standard for system-level coordination of redundancy using this hardware based topology.

Redundancy methods based on messaging protocols generally have problems with latency and reliability. Typical redundancy methods such as multiple spanning tree protocol (MSTP) or other layer 2 protocols are difficult to configure, produce non-optimal forwarding paths, and result in slow failover times.

SUMMARY OF THE DISCLOSURE

Disclosed systems and methods coordinate backplane redundancy via controlled link status changes.

In one embodiment, a method coordinates backplane redundancy in a system including a plurality of nodes configured to communicate data packets through a first switching hub and a second switching hub within the system. The method includes assigning the first switching hub to an active state and the second switching hub to a standby state such that the plurality of nodes communicate the data packets through physically enabled first backplane links to the first switching hub. The plurality of nodes physically enables second backplane links so that they are in a condition to communicate the data packets to the second switching hub. The method also includes detecting a failover condition, and in response to the detected failover condition, triggering a messageless failover process to change the second switching hub to the active state and the first switching hub to the standby state. The messageless failover process includes temporarily disabling, at the first switching hub, the first backplane links between the first switching hub and the plurality of nodes. Each of the plurality of nodes independently detects the disabled first backplane links to the first switching hub. In response to detecting the disabled first backplane links, each of the plurality of nodes independently configures itself to communicate the data packets through the second backplane links to the second switching hub and to stop communicating the packets through the first backplane links to the first switching hub.

In certain embodiments, after a predetermined period of time, the method includes re-enabling the first backplane links such that the first backplane links are in a condition to communicate the data packets between the plurality of nodes and the first switching hub.

In certain embodiments, assigning the first switching hub to an active state and the second switching hub to a standby state includes a system initialization process for selecting the first switching hub for the active state and the second switching hub for the standby state, temporarily disabling (at the second switching hub) the second backplane links between the second switching hub and the plurality of nodes, detecting (at the plurality of nodes) the disabled second backplane links to the second switching hub, and in response to detecting the disabled second backplane links, triggering a messageless failover so as to configure the plurality of nodes to communicate the data packets through the first backplane links to the first switching hub and to stop communicating the packets through the second backplane links to the second switching hub.

Additional aspects and advantages will be apparent from the following detailed description of preferred embodiments, which proceeds with reference to the accompanying drawings.

BRIEF DESCRIPTION OF THE DRAWINGS

Non-limiting and non-exhaustive embodiments of the disclosure will now be described in more detail, by way of example only, with reference to the accompanying drawings, in which.

DETAILED DESCRIPTION OF PREFERRED EMBODIMENTS

Figure 1:
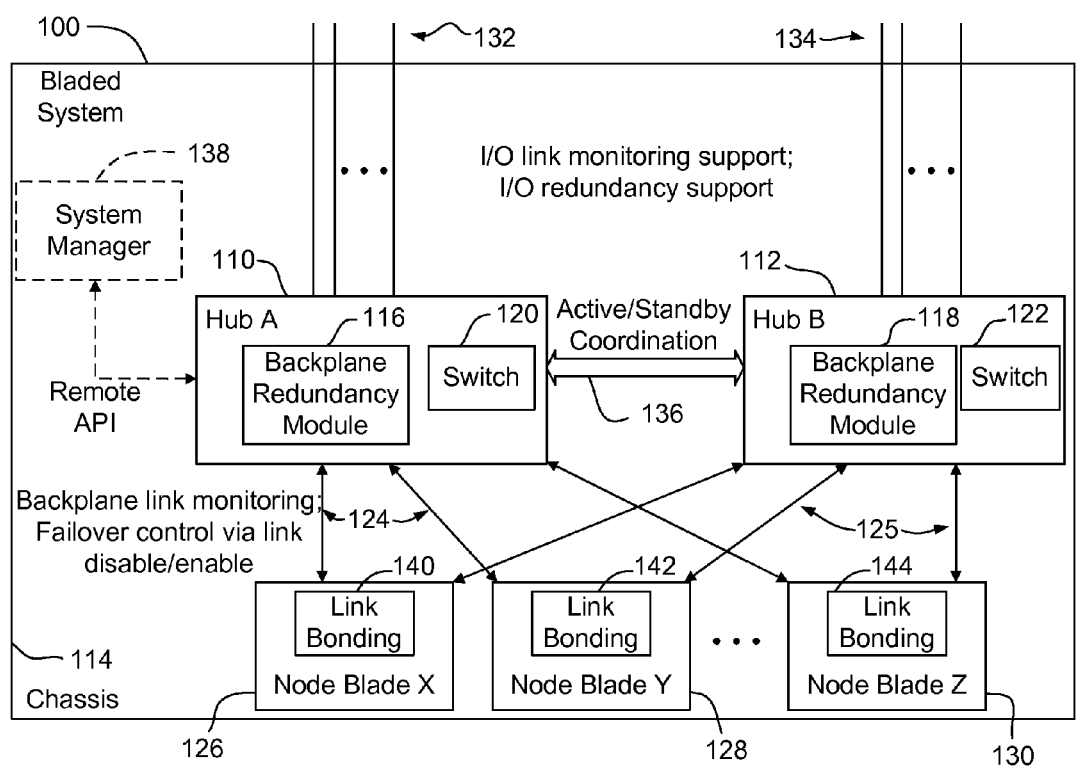
FIG. 1 is a block diagram of a bladed system with backplane redundancy according to one embodiment.

Messageless triggering embodiments disclosed herein are used for initiating and coordinating active/standby failovers in a switching system with a dual-star backplane topology. Rather than use messaging protocols, disclosed embodiments use link state changes to initiate and coordinate active/standby backplane redundancy across processing nodes. The link state changes include physically disabling and/or enabling links (i.e., at the physical layer).

The embodiments disclosed herein may be used for switch redundancy in any type of switching system with dual-star backplanes. For illustrative purposes, and not by way of limitation, example embodiments disclosed herein use an Ethernet-based backplane such as those included in ATCA or other bladed systems. However, those skilled in the art will recognize from the disclosure herein that any type of dual-star backplane or dual switching topology may be used. Further, this disclosure is not limited to bladed systems and the disclosed embodiments may be applied to any distributed system, modular computer, or other system using redundant switches.

In certain embodiments, a backplane redundancy manager is implemented in an Ethernet switch of one or both hub blades of a bladed system. As discussed below, the backplane redundancy manager may be a logical entity including, for example, distributed software modules (e.g., backplane redundancy modules) located in each hub blade. The backplane redundancy manager is responsible for coordinating backplane redundancy and failovers across the node blades within the bladed system by using link state changes initiated from the hub blades. The backplane redundancy manager coordinates the alignment of the node blades to one of the hub blades as the active hub blade and the other hub blade as the standby hub blade. Thus, the backplane redundancy manager controls the system to provide an active backplane data path between communicating resources in the bladed system. The backplane redundancy manager uses link status changes for such coordination.

An "active" hub blade means that data path traffic (e.g., comprising Ethernet packets) is transferred or forwarded between resources in the system over the backplane network implemented by the active hub blade and its Ethernet switching device(s). A "standby" hub blade means that there is no data path traffic between resources in the system over the backplane network implemented by the standby hub blade and its Ethernet switching device(s). However, the switching device(s) and links on the standby hub blade are physically enabled and are capable and ready to accept traffic during a failover. "Failover" is the process in which the standby hub blade is promoted to an active state. A failover process may commence when a fault is detected by the active hub blade on one of its ports, if the active switch blade is detected to no longer be operational, or as a result of an administrative operation to request that the failover be performed (e.g., for testing or maintenance).

During system initialization, the backplane redundancy manager ensures that the node blades use the designated active hub blade as the active backplane path by temporarily disabling the backplane links on the standby hub blade. Likewise, in a failover or switchover mode, the backplane redundancy manager temporarily disables the backplane links on the formerly active hub blade. The node blades detect the loss of backplane link on the formerly active hub blade to trigger or initiate failover of their respective backplane links so as to locally align on the newly active hub blade. After a short duration (e.g., in a range between about 1 second and about 3 seconds), the backplane links on the standby hub blade (i.e., the formerly active hub blade) are re-enabled so that a future failover can occur with minimal latency or traffic loss.

To support the redundancy process according to certain embodiments, the node blades are configured for active/standby "bonding" of the links to the dual-star backplane, such that one of the node's backplane links is used for data path traffic, while the other backplane link is in standby mode and is in a state that is ready to be quickly promoted to active mode. During normal operation (e.g., other than during system initialization, failover, or switchover modes), both active and standby links are physically enabled from a switching perspective and a physical link perspective.

Although the node blades independently determine active/standby links using bonding, the backplane redundancy manager uses link state toggling for backplane Ethernet links as the messageless triggering mechanism for the node blades to select the appropriate active hub blade. The disclosed systems and methods reduce latency as compared to systems that use a protocol for creating, transmitting, receiving, and processing messages. The disclosed systems and methods are also less complex as compared to other redundancy systems because they do not need to use a complex messaging protocol and service.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, elements, materials, or operations are not shown or described in detail in order to avoid obscuring aspects of the invention. Furthermore, the described features, structures, or characteristics may be combined in any suitable manner in one or more embodiments.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a non-transitory, machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

FIG. 1 is a block diagram of a bladed system 100 with backplane redundancy according to one embodiment. In this example, the bladed system 100 has an ATCA architecture with a dual-star Ethernet backplane for both Base and Fabric interfaces. However, other types of bladed systems, distributed systems, or modular computers using multiple switches or backplanes can also be used. The bladed system 100 includes two hubs 110, 112 (shown as hub A and hub B) within a chassis 114. The hubs 110, 112 may also be referred to herein as "hub blades", "switch blades", "switching hubs," "hubs," or "switching and control modules."

In this example, both hubs 110, 112 include a respective backplane redundancy module 116, 118 including respective switches 120, 122. The switches 120, 122 are Ethernet switches with ports for establishing backplane links 124, 125 with a plurality of node blades 126, 128, 130 (shown as node blade X, node blade Y, and node blade Z) within the chassis 114 of the bladed system 100. In this example, the backplane redundancy manager comprises the backplane redundancy modules 116, 118. Although the backplane redundancy modules 116, 118 are shown within the respective hubs 110, 112, skilled persons will recognize from the disclosure herein that the backplane redundancy modules 116, 118 may comprise a single instance of the backplane redundancy module. Further, the backplane redundancy modules 116, 118 may be distributed among the hubs 110, 112 and the node blades 126, 128, 130.

The node blades 126, 128, 130 may be configured, for example, as central processing units (CPUs), graphic processing units (GPUs), digital signal processors (DSPs), or network processing units (NPUs) including servers and other networking devices or appliances. The node blades 126, 128, 130 may be configured to perform a wide variety of services or applications such as mobile network applications, wireless core network applications, voice over IP (VOIP) applications, conferencing applications, other media services involving voice, video, and data, and services associated with deep packet inspection. The switches 120, 122 also include input and output (I/O) ports for establishing respective external I/O links 132, 134 with an external network or client device (not shown). For example, the external I/O links 132, 134 may be used to communicate packets between the bladed system and a local area network, the Internet, and/or other bladed systems as part of a data center, computing center, and/or switching center.

The backplane redundancy modules 116, 118 implement redundancy while leveraging the dual star topology of the bladed system 100. The backplane redundancy modules 116, 118 establish an active/standby relationship between the two hubs 110, 112 and their respective switches 120, 122. The switches 120, 122 and the backplane links 124, 125 are physically enabled (except as part of failover processing). The active/standby dataplane use of the hubs 110, 112 is overlaid on top of the physically enabled switches 120, 122 and backplane links 124, 125. The active hub (e.g., hub 110) provides the Ethernet paths through the bladed system 100 for data path traffic. The switches 120, 122 in both hubs 110, 112 are always operating so as to contribute to fast failover times of about 250 milliseconds (ms) or less. In addition, or in other embodiments, the backplane redundancy modules 116, 118 monitor the external I/O links 132, 134 and couple them with backplane failovers.

In certain embodiments, the backplane redundancy modules 116, 118 run simultaneously on their respective hubs 110, 112 and communicate with one another (as indicated by arrow 136 in FIG. 1) for active/standby coordination. In one embodiment, the backplane redundancy modules 116, 118 negotiate the active/standby relationship between them based on which hub 110, 112 has the highest number of active backplane links. For example, if the hub 110 currently has a higher number of active (or physically enabled) backplane links 124 than the number of active backplane links 125 of the hub 112, then the backplane redundancy modules 116, 118 select the hub 110 as active and the hub 112 as standby. In the event of a tie, the hub (e.g., either the hub 110 or the hub 112) in the lower numbered slot of the bladed system 100 takes priority according to one embodiment and becomes active.

Once the active/standby relationship between the backplane redundancy modules 116, 118 is established, the backplane redundancy modules 116, 118 on the hubs 110, 112 each monitor the health (e.g., switching and control module faults) of its peer by sending periodic messages (e.g., heartbeating) over either a directly connected communication link (as indicated by arrow 136) or an independent path through a network. The backplane redundancy module on the active and standby hubs also monitor any backplane link changes (e.g., faults on the backplane links 124, 125).

In certain embodiments, the backplane redundancy modules 116, 118 initiate a failover if one or more of the following conditions occur: the standby hub has a higher number of active backplane links than those of the active hub; the active hub does not respond to messages sent to it by the standby hub; and/or an administrator forces a failover (e.g., using a remote application programming interface (API) of an optional system manager 138). In certain embodiments, the backplane redundancy modules 116, 118 also take into account the number of active external I/O links 132, 134 and/or the total number of active links (backplane plus external I/O) of the respective hubs 110, 112. It should be noted, however, that the backplane redundancy modules 116, 118 do not monitor the failures in the node blades 126, 128, 130 because such failures are not backplane failures and are generally processed in other ways (e.g., through the optional system manager 138).

Continuing with the example of the hub 110 being active just before a failover, the active backplane redundancy module 116 temporarily disables the backplane links 124 of the hub 110. The node blades 126, 128, 130 detect the loss of link on the formerly active hub 110, which triggers or initiates failover of their respective backplane interfaces so as to locally align to the backplane links 125 of the new active hub 112. After a short duration (e.g., a few seconds), the backplane links 124 on the new standby hub 110 are re-enabled so that a future failover can occur with minimal latency or traffic loss.

As shown in FIG. 1, the node blades 126, 128, 130 each include two backplane interfaces for communicating with both the hub 110 and the hub 112. The node blades 126, 128, 130 monitor their backplane links and ensure that traffic is sent only via the active hub (e.g., either the hub 110 or the hub 112). To enable backplane redundancy, according to certain embodiments, the node blades 126, 128, 130 include respective link bonding modules 140, 142, 144 to bond the two backplane interfaces together on each node blade 126, 128, 130. In certain embodiments, the link bonding modules 140, 142, 146 include, for example, a Linux bonding driver configured in an active/backup mode to achieve the bonding. In such embodiments, the Linux bonding driver detects link faults and automatically performs a failover if the active link fails. Other bonding drivers (e.g., other than Linux-based) may also be used.

In other embodiments, the backplane redundancy modules 116, 118 and the link bonding modules 140, 142, 144 run a bonding management application that uses virtual local area networks (VLANs) to ensure that traffic is routed to the active hub. The bonding management application creates VLANs on the hubs 110, 112 and the node blades 126, 128, 130. The interface to the active hub is added to all VLANs in use on the active hub, while the interface to the standby hub does not participate in the VLANs. In the event of a failover, VLAN participation is moved to the newly-active interface and removed from the other interface.

The bladed system 100 may include a dual-star Ethernet backplane for both a Base interface (e.g., operating at about 1 Gbps for management traffic) and a Fabric interface (e.g., operating at about 10 Gbps or 40 Gbps for user or network client traffic). In certain embodiments, the backplane redundancy modules 116, 118 may be selectively configured by a user to monitor the Base interface, the Fabric interface, or both the Base interface and the Fabric interface. To simultaneously monitor both the Base interface and the Fabric interface, for example, the user may select a "coupled" mode wherein a failover in one interface causes a failover in the other interface. In a "decoupled" mode, a failover in one interface does not affect the other interface. For coupled monitoring, only one instance of the backplane redundancy module runs (e.g., for both interfaces). For decoupled monitoring, separate instances of the backplane redundancy module run for the two interfaces.

As indicated in FIG. 1, certain embodiments of the backplane redundancy modules 116, 118 include I/O link monitoring support and I/O redundancy support. The backplane redundancy modules 116, 118 may allow users to selectively couple I/O port redundancy with backplane redundancy. For example, the backplane redundancy modules 116, 118 may be configured on a per-I/O port basis. As discussed below, the backplane redundancy modules 116, 118 may provide I/O redundancy support with I/O link monitoring or without I/O link monitoring.

In certain embodiments, the user may select which of the external I/O links 132 of the active hub 110 to monitor. It may be useful, for example, to monitor those external I/O links 132 that provide communication between the bladed system 100 and another bladed system (not shown), such as within a data center, computing center, and/or switching center. In one embodiment, the backplane redundancy module 116 of the active hub 110 monitors the backplane links 124 and the external I/O links 132 in a coupled fashion such that failovers in either domain cause both domains to failover.

Figure 2:
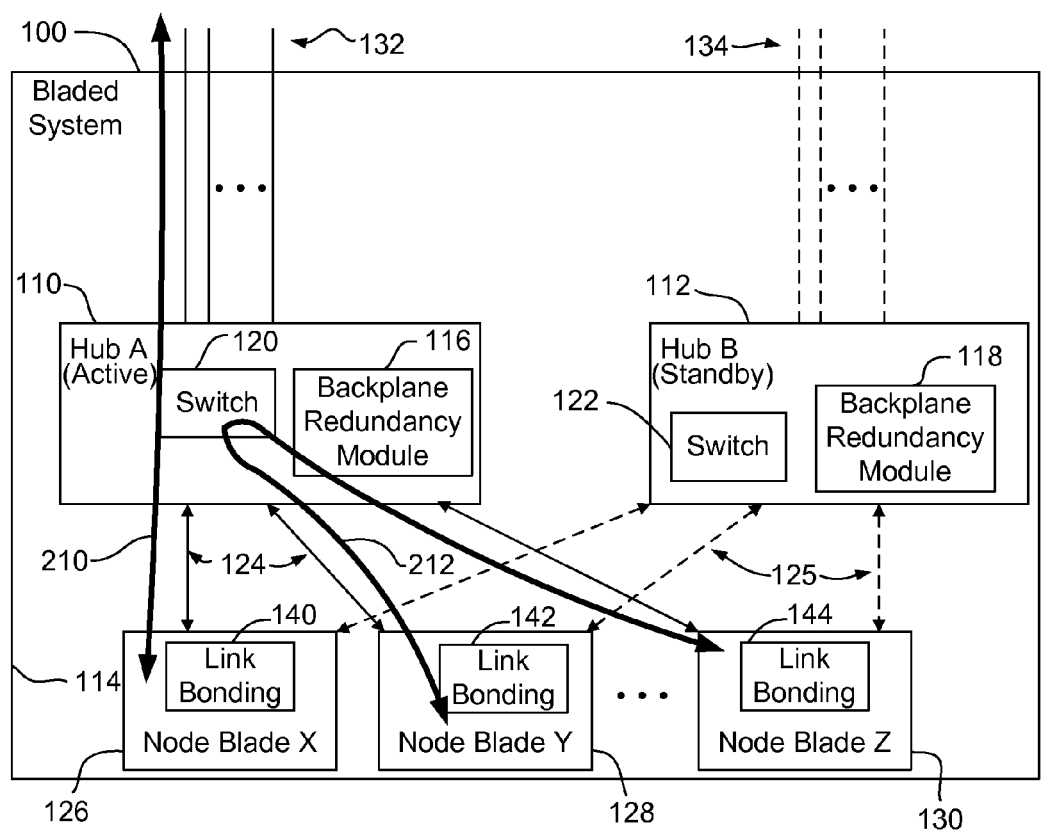
FIG. 2 is a block diagram illustrating redundancy for dataflows with monitored I/O ports according to one embodiment.

FIG. 2 is a block diagram illustrating redundancy for dataflows with monitored I/O ports according to one embodiment. In FIG. 2, a portion of the bladed system 100 is shown, including the hub 110, the hub 112, and the node blades 140, 142, 144. In this example, the hub 110 is active and the hub 112 is standby. Thus, for illustrative purpose, the backplane links 124 and the external I/O links 132 corresponding to the active hub 110 are shown with solid lines (indicating active links), whereas the backplane links 125 and the external I/O links 134 of the standby hub 112 are shown with dashed lines (indicating standby links). FIG. 2 illustrates dataflows passing through the active hub 110. For example, a dataflow represented by double arrow 210 is shown passing through the active hub 110 between the node blade 126 and one of the external I/O links 132. Similarly, a dataflow represented by a double arrow 212 is shown passing through the active hub 110 between the node blade 128 and the node blade 130.

In one embodiment, the backplane redundancy module 116 changes VLAN participation of the monitored external I/O links 132 based on link status using the virtual router redundancy protocol. The backplane redundancy module 116 monitors the external I/O links 132 and the backplane links 124 together and routes dataflows through the active hub 110 (e.g., as shown by arrows 210, 212 in FIG. 2). In this embodiment, VLANs join interfaces from external routers (not shown) to the active and the standby hubs 110, 112. The virtual router redundancy protocol provides redundancy between the VLAN route interfaces.

Figure 3:
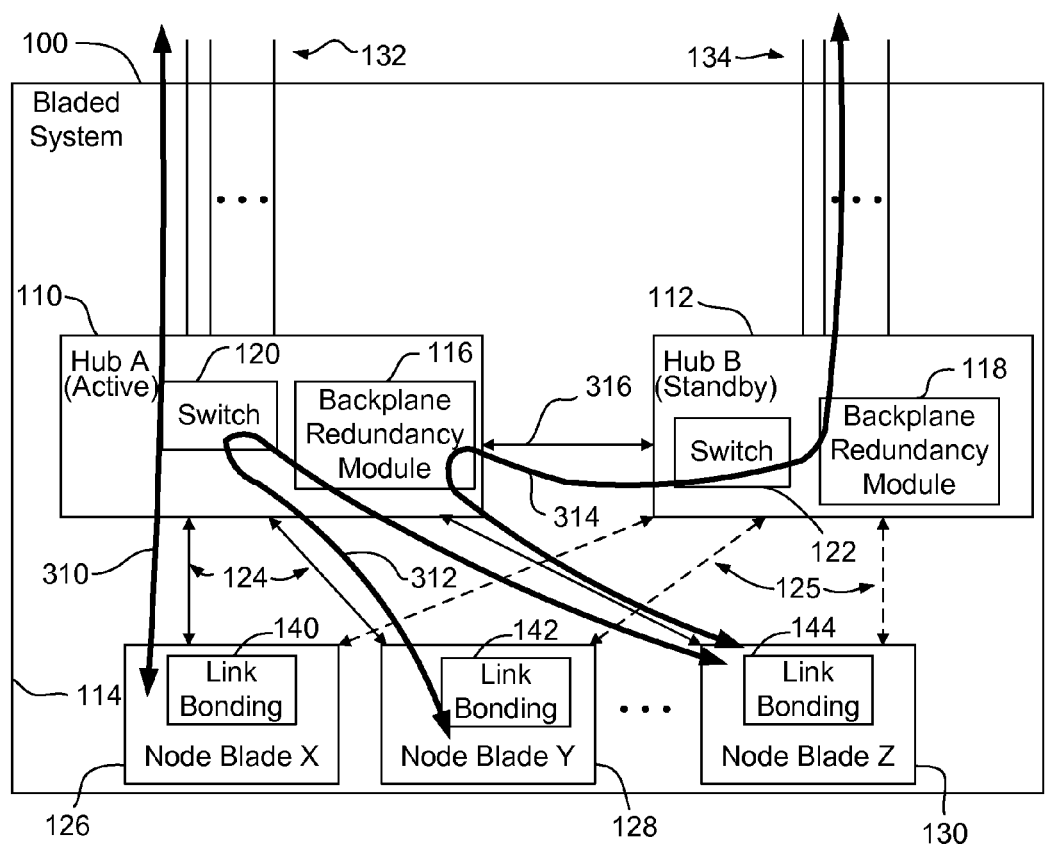
FIG. 3 is a block diagram illustrating redundancy for dataflows with unmonitored I/O ports according to one embodiment.

FIG. 3 is a block diagram illustrating redundancy for dataflows with unmonitored I/O ports according to one embodiment. In FIG. 3, a portion of the bladed system 100 is shown, including the hub 110, the hub 112, and the node blades 140, 142, 144. In this example, the hub 110 is active and the hub 112 is standby. For illustrative purpose, the backplane links 124 corresponding to the active hub 110 are shown with solid lines (indicating active links), whereas the backplane links 125 of the standby hub 112 are shown with dashed lines (indicating standby links). In this example, the external I/O links 132, 134 are unmonitored and are shown with solid lines to indicate that they are active (even for the external I/O links 134 corresponding to the standby hub 112).

FIG. 3 illustrates dataflows passing through the active hub 110 and the standby hub 112. For example, a dataflow represented by double arrow 310 is shown passing through the active hub 110 between the node blade 126 and one of the external I/O links 132. Similarly, a dataflow represented by a double arrow 312 is shown passing through the active hub 110 between the node blade 128 and the node blade 130. Further, a dataflow represented by a double arrow 314 is shown passing between the external I/O links 134 and the node blade 130 passing through both the standby hub 112 and the active hub 110. Because the external I/O links 132, 134 are unmonitored, backplane port failovers do not affect the I/O ports. Similarly, I/O port failovers do not affect the backplane ports. Thus, the external I/O links 134 on the standby hub 112 are allowed to be active, and traffic is routed between the hubs 110, 112 on a hub-to-hub (or interswitch) link 316. Leaving I/O ports unmonitored is useful, for example, when the I/O ports are used for network connectivity.

The backplane redundancy modules 116, 118 provide redundancy support for the unmonitored I/O ports. In one embodiment, the backplane redundancy modules 116, 118 use the spanning tree protocol to provide redundancy on the external I/O links 132, 134 and on the hub-to-hub (interswitch) link 316. In another embodiment, the backplane redundancy modules 116, 118 use the virtual router redundancy protocol wherein VLANs join interfaces from external routers (not shown) to the active and the standby hub 110, 112. The virtual router redundancy protocol provides redundancy between VLAN route interfaces.

Figure 4:
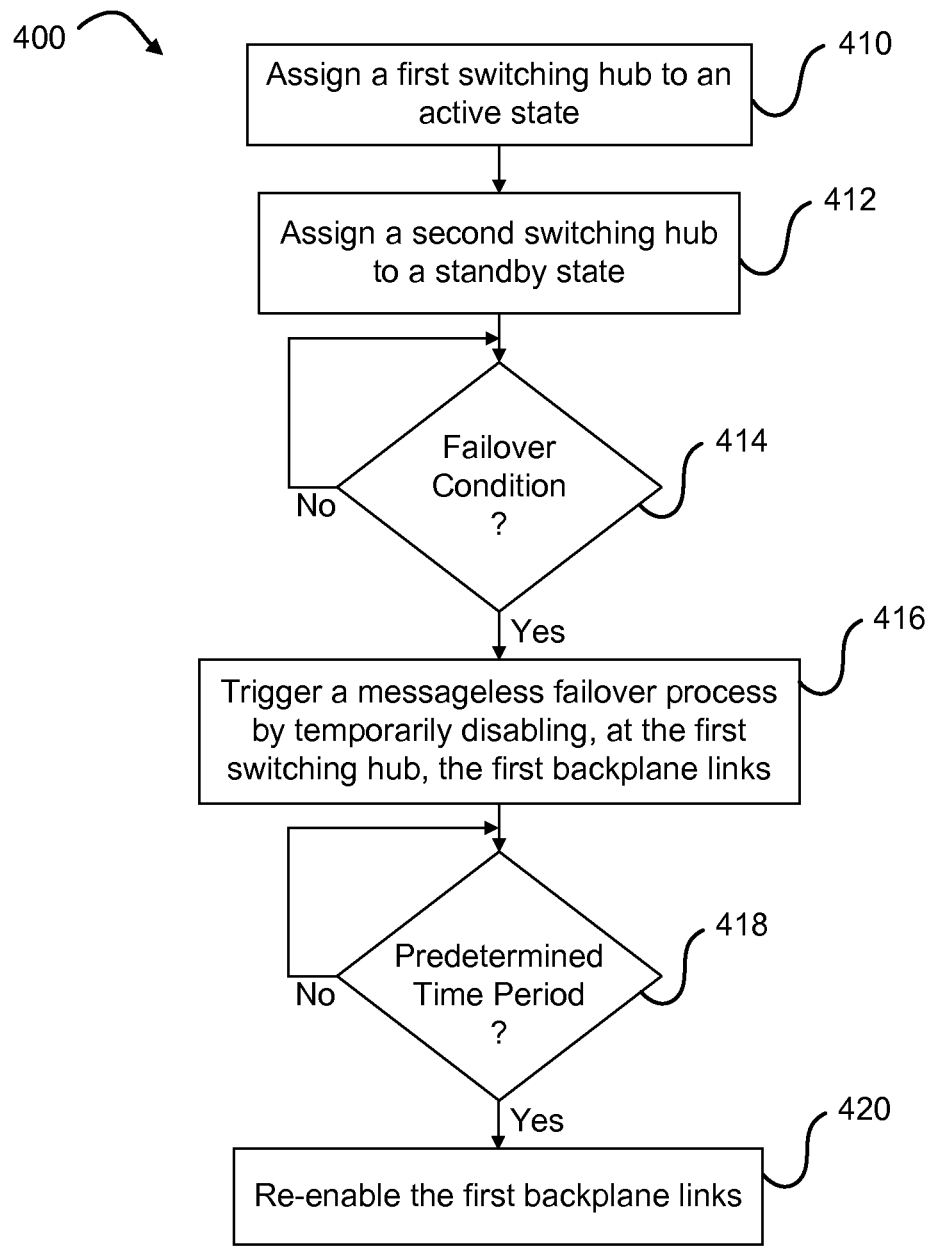
FIG. 4 is a flow chart of a method for coordinating backplane redundancy in a system according to one embodiment.

FIG. 4 is a flow chart of a method 400 for coordinating backplane redundancy in a system according to one embodiment. The method 400 includes assigning 410 a first switching hub to an active state, and assigning 412 a second switching hub to a standby state. A plurality of nodes is configured to communicate data packets through physically enabled first backplane links to the (active) first switching hub. Although the second switching hub is in a standby state, the plurality of nodes is configured to enable second backplane links that are in a condition to communicate the data packets to the second switching hub. While the second switching hub is in the standby state, however, the plurality of nodes do not communicate data packets through the enabled second backplane links.

The method 400 also includes querying 414 whether a failover condition has occurred. In response to detecting the failover condition, the method 400 includes triggering 416 a messageless failover process by temporarily disabling, at the first switching hub, the first backplane links. Triggering 416 the messageless failover process changes the second switching hub to the active state and the first switching hub to the standby state, and (as discussed in FIG. 5 below) causes the plurality of nodes to stop communicating through the first backplane links with the first switching hub and to start communicating through the previously enabled second backplane links with the second switching hub.

In addition, or in other embodiments, the method 400 may include querying 418 whether a predetermined time has elapsed. The predetermined time period starts upon detecting the failover condition and ends after the plurality of nodes are configured to communicate the data packets through the second backplane links. After the predetermined time period has lapsed, the method 400 includes re-enabling 420 the first backplane links. However, the plurality of nodes continues to communicate the data packets only through the second backplane links (e.g., until the next failover condition is detected).

Figure 5:
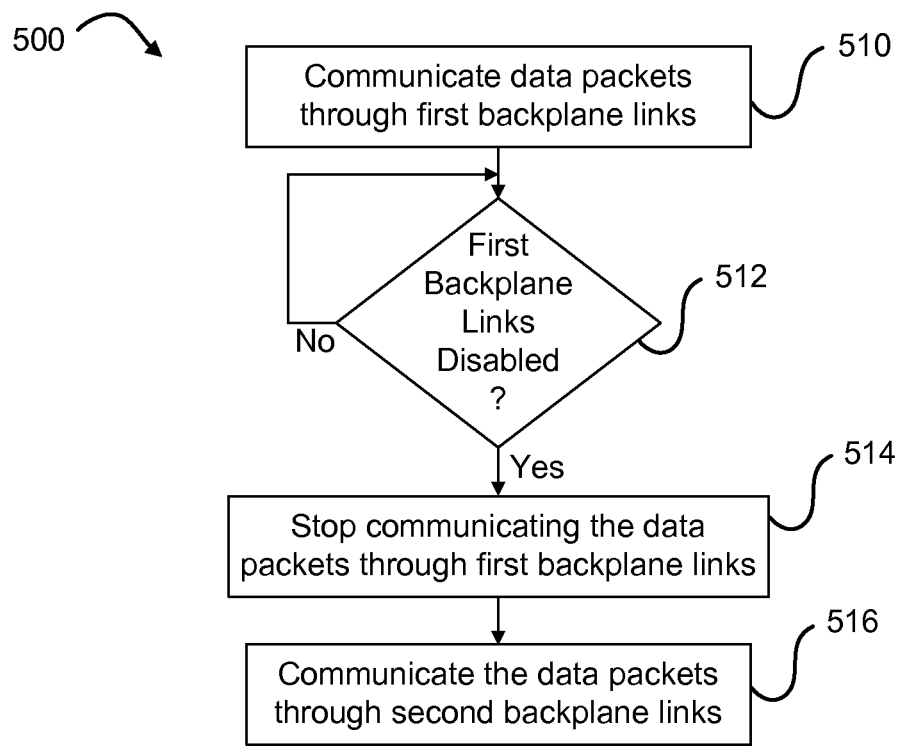
FIG. 5 is a flow chart of a method for operating a node in a system for coordinating backplane redundancy according to one embodiment.

FIG. 5 is a flow chart of a method 500 for operating a node in a system for coordinating backplane redundancy according to one embodiment. The method 500 includes communicating 510 through first backplane links with a first switching hub, and querying 512 whether the first backplane links have been disabled. In response to detecting that the first backplane links have been disabled, the method 500 includes stopping 514, at the node, communicating the data packets through the backplane links, and communicating 516 the data packets through second backplane links with a second switching hub.

It will be understood by those having skill in the art that many changes may be made to the details of the above-described embodiments without departing from the underlying principles of the invention. The scope of the present invention should, therefore, be determined only by the following claims.

The invention claimed is:

1. A method for coordinating backplane redundancy in a system including a plurality of node blades configured to communicate data packets through a first switching hub and a second switching hub within the system, the method comprising:

assigning the first switching hub to an active state and the second switching hub to a standby state such that the plurality of node blades communicate the data packets through physically enabled first backplane links to the first switching hub, and wherein the plurality of node blades physically enable second backplane links so that they are in a condition to communicate the data packets to the second switching hub;

detecting a failover condition; and in response to the detected failover condition, triggering a link state toggling process to change the second switching hub to the active state and the first switching hub to the standby state, the link state toggling process including temporarily disabling, at a physical layer of the first switching hub, the first backplane links between the first switching hub and the plurality of node blades, the link state toggling process causing a link state change for each link of the first backplane links to a down state;

wherein each of the plurality of node blades independently detects the disabled first backplane links to the first switching hub based on the down state of the corresponding link state, and wherein, in response to detecting the down state of the corresponding link state, each of the plurality of node blades independently configures itself to communicate the data packets through the second backplane links to the second switching hub and to stop communicating the packets through the first backplane links to the first switching hub.

2. The method of claim 1, further comprising:

after a predetermined period of time, re-enabling the first backplane links such that the first backplane links are in a condition to communicate the data packets between the plurality of node blades and the first switching hub.

3. The method of claim 1, wherein a period of time that starts at detecting the failover and ends after the plurality of node blades are configured to communicate the data packets through the second backplane links to the second switching hub is less than about 250 milliseconds.

4. The method of claim 1, wherein assigning the first switching hub to an active state and the second switching hub to a standby state comprises:

a system initialization process for:

selecting the first switching hub for the active state and the second switching hub for the standby state;

temporarily disabling, at the second switching hub, the second backplane links between the second switching hub and the plurality of node blades;

detecting, at the plurality of node blades, the disabled second backplane links to the second switching hub; and in response to detecting the disabled second backplane links, triggering a link state toggling so as to configure the plurality of node blades to communicate the data packets through the first backplane links to the first switching hub and to stop communicating the packets through the second backplane links to the second switching hub.

5. The method of claim 4, further comprising:

after a predetermined period of time, re-enabling the second backplane links such that the second backplane links are in the condition to communicate the data packets between the plurality of node blades and the second switching hub.

6. The method of claim 4, wherein selecting the first switching hub for the active state and the second switching hub for the standby state comprises:

determining that there are more of the first backplane links than the second backplane links; and in response to the determination, assigning the active state to the first switching hub.

7. The method of claim 1, wherein detecting the failover condition comprises:

monitoring, at the first switching hub, for faults on the first backplane links;

monitoring, at the second switching hub, for faults on the second backplane links; and detecting the failover condition when the detected faults cause the number of active links of the first switching hub to be less than the number of standby links of the second switching hub.

8. The method of claim 7, further comprising:

detecting the failover condition in response to a user request for the failover process.

9. The method of claim 1, wherein the system comprises a bladed system comprising two dual-star Ethernet backplane interfaces, wherein detecting the failover condition comprises allowing a user to select between monitoring for faults only on a first interface, only on a second interface, and on both the first interface and the second interface.

10. The method of claim 9, further comprising:

when monitoring for faults on both the first interface and the second interface, allowing the user to select between a coupled mode and a decoupled mode, wherein detecting the failover condition in the coupled mode initiates the failover process in both the first interface and the second interface, and wherein detecting the failover condition in the decoupled mode initiates the failover process in only one of the first interface and the second interface depending on where a fault is detected.

11. The method of claim 10, wherein the bladed system comprises an architecture based on Advanced Telecommunications Computing Architecture (ATCA).

12. The method of claim 11, wherein the first interface comprises a Base interface and the second interface comprises a Fabric interface.

13. The method of claim 1, further comprising:

allowing a user to selectively couple external input/output (I/O) link redundancy with backplane link redundancy, wherein the user selects which of a plurality of external I/O links of a switching hub in the active state to monitor.

14. The method of claim 13, wherein the failover condition corresponding to the backplane links causes a failover condition corresponding to monitored external I/O links, and wherein a failover condition corresponding to the monitored external I/O links causes the failover condition corresponding to the backplane links.

15. The method of claim 13, wherein the failover condition corresponding to the backplane links does not cause a failover condition corresponding to unmonitored external I/O links, and wherein a failover condition corresponding the unmonitored external I/O links does not cause a failure condition corresponding to the backplane links.

16. A system comprising:
a first switching hub;
a second switching hub;
a plurality of node blades;
a dual-star backplane for electrically connecting the plurality of node blades to the first switching hub and the second switching hub, wherein the plurality of node blades are each configured to communicate data packets through the first switching hub and the second switching hub within the system; and
a backplane redundancy module to:
assign the first switching hub to an active state and the second switching hub to a standby state such that the plurality of node blades communicate the data packets through physically enabled first backplane links to the first switching hub, and wherein the plurality of node blades physically enable second backplane links that are in a condition to communicate the data packets to the second switching hub;
detect a failover condition; and
in response to the detected failover condition, trigger a link state toggling process to change the second switching hub to the active state and the first switching hub to the standby state, the link state toggling process including temporarily disabling, at a physical layer of the first switching hub, the first backplane links between the first switching hub and the plurality of node blades, the link state toggling process causing a link state change for each link of the first backplane links to a down state;
wherein each of the plurality of node blades independently detects the disabled first backplane links to the first switching hub based on the down state of the corresponding link state, and
wherein, in response to detecting the down state of the corresponding link state, each of the plurality of node blades independently configures itself to communicate the data packets through the second backplane links to the second switching hub and to stop communicating the packets through the first backplane links to the first switching hub.

17. The system of claim 16, wherein the backplane redundancy module is further configured to:
after a predetermined period of time, re-enable the first backplane links such that the first backplane links are in a condition to communicate the data packets between the plurality of node blades and the first switching hub.

18. The system of claim 16, wherein a period of time that starts at detecting the failover condition and ends after the plurality of node blades are configured to communicate the data packets through the second backplane links to the second switching hub is less than about 250 milliseconds.

19. The system of claim 16, wherein assigning the first switching hub to an active state and the second switching hub to a standby state comprises:
a system initialization process for:
selecting the first switching hub for the active state and the second switching hub for the standby state;
temporarily disabling, at the second switching hub, the second backplane links between the second switching hub and the plurality of node blades;
detecting, at the plurality of node blades, the disabled second backplane links to the second switching hub; and
in response to detecting the disabled second backplane links, triggering a link state toggling so as to configure the plurality of node blades to communicate the data packets through the first backplane links to the first switching hub and to stop communicating the packets through the second backplane links to the second switching hub.

20. The system of claim 19, wherein the backplane redundancy module is further configured to:
after a predetermined period of time, re-enable the second backplane links such that the second backplane links are in the condition to communicate the data packets between the plurality of node blades and the second switching hub.

21. The system of claim 19, wherein selecting the first switching hub for the active state and the second switching hub for the standby state comprises:
determining that there are more of the first backplane links than the second backplane links; and
in response to the determination, assigning the active state to the first switching hub.

22. The system of claim 16, wherein detecting the failover condition comprises:
monitoring, at the first switching hub, for faults on the first backplane links;
monitoring, at the second switching hub, for faults on the second backplane links; and
detecting the failover condition when the detected faults cause the number of active links of the first switching hub to be less than the number of standby links of the second switching hub.

23. The system of claim 22, wherein the backplane redundancy module is further configured to:
detect the failover condition in response to a user request for the failover process.

24. The system of claim 16, wherein the system comprises a bladed system comprising two dual-star Ethernet backplane interfaces, wherein detecting the failover condition comprises allowing a user to select between monitoring for faults only on a first interface, only on a second interface, and on both the first interface and the second interface.

25. The system of claim 24, wherein the backplane redundancy module is further configured to:
when monitoring for faults on both the first interface and the second interface, allow the user to select between a coupled mode and a decoupled mode,
wherein detecting the failover condition in the coupled mode initiates the failover process in both the first interface and the second interface, and
wherein detecting the failover condition in the decoupled mode initiates the failover process in only one of the first interface and the second interface depending on where a fault is detected.

26. The system of claim 25, wherein the bladed system comprises an architecture based on Advanced Telecommunications Computing Architecture (ATCA).

27. The system of claim 26, wherein the first interface comprises a Base interface and the second interface comprises a Fabric interface.

28. The system of claim 16, wherein the backplane redundancy module is further configured to:
allow a user to selectively couple external input/output (I/O) link redundancy with backplane link redundancy, wherein the user selects which of a plurality of external I/O links of a switching hub in the active state to monitor.

29. The system of claim 28, wherein the failover condition corresponding to the backplane links causes a failover condition corresponding to monitored external I/O links, and wherein a failover condition corresponding to the monitored external I/O links causes the failover condition corresponding to the backplane links.

30. The system of claim 28, wherein the failover condition corresponding to the backplane links does not cause a failover condition corresponding to unmonitored external I/O links, and wherein a failover condition corresponding the unmonitored external I/O links does not cause a failure condition corresponding to the backplane links.

31. A non-transitory computer-readable medium comprising program code for coordinating backplane redundancy in a system including a plurality of node blades configured to communicate data packets through a first switching hub and a second switching hub within the system, the method comprising:

assigning the first switching hub to an active state and the second switching hub to a standby state such that the plurality of node blades communicate the data packets through physically enabled first backplane links to the first switching hub, and wherein the plurality of node blades physically enable second backplane links that are in a condition to communicate the data packets to the second switching hub;

detecting a failover condition; and in response to the detected failover condition, triggering a link state toggling process to change the second switching hub to the active state and the first switching hub to the standby state, the link state toggling process including temporarily disabling, at a physical layer of the first switching hub, the first backplane links between the first switching hub and the plurality of node blades, the link state toggling process causing a link state change for each link of the first backplane links to a down state;

wherein each of the plurality of node blades independently detects the disabled first backplane links to the first switching hub based on the down state of the corresponding link state, and wherein, in response to detecting the down state of the corresponding link state, each of the plurality of node blades independently configures itself to communicate the data packets through the second backplane links to the second switching hub and to stop communicating the packets through the first backplane links to the first switching hub.

* * * * *